(12) United States Patent
Clerc et al.

(10) Patent No.: US 10,406,699 B2
(45) Date of Patent: Sep. 10, 2019

(54) SECURE, MOTOR-DRIVEN HINGE TO BE PROVIDED ON A HUMANOID ROBOT

(71) Applicant: SOFTBANK ROBOTICS EUROPE, Paris (FR)

(72) Inventors: Vincent Clerc, Clamart (FR); Ludovic Houchu, Beynes (FR); Vincent Chevry, Paris (FR)

(73) Assignee: SOFTBANK ROBOTICS EUROPE, Paris (FR)

( * ) Notice: Subject to any disclaimer, the term of this patent is extended or adjusted under 35 U.S.C. 154(b) by 451 days.

(21) Appl. No.: 15/311,113

(22) PCT Filed: Jun. 5, 2015

(86) PCT No.: PCT/EP2015/062621
§ 371 (c)(1),
(2) Date: Nov. 14, 2016

(87) PCT Pub. No.: WO2015/185748
PCT Pub. Date: Dec. 10, 2015

(65) Prior Publication Data
US 2017/0072576 A1    Mar. 16, 2017

(30) Foreign Application Priority Data
Jun. 5, 2014 (FR) ..................................... 14 55092

(51) Int. Cl.
*B25J 19/00* (2006.01)

(52) U.S. Cl.
CPC ................................ *B25J 19/0004* (2013.01)

(58) Field of Classification Search
CPC ..... B25J 19/0062; B25J 18/04; B25J 19/0004
USPC ............................................ 74/490.01–490.1
See application file for complete search history.

(56) References Cited

U.S. PATENT DOCUMENTS 4,693,665 A    9/1987    Friederichs et al.
2013/0039730 A1    2/2013    Sueyoshi et al.

FOREIGN PATENT DOCUMENTS

EP    0 176 204 A1    4/1986
JP    2011-251057 A    12/2011

*Primary Examiner* — Victor L MacArthur
(74) *Attorney, Agent, or Firm* — Baker & Hostetler LLP

(57) ABSTRACT

A secured motorized articulation mounted between a first and a second limb of a humanoid-type robot, comprises: a motor comprising a fixed part linked to the first limb, and a mobile part that can be moved relative to the fixed part and linked to the second limb relative to the first limb, a brake capable of exerting a force on the mobile part of the motor by spring effect, to prevent the movement of the mobile part relative to the fixed part, an actuator capable of displacing the brake by opposing the spring effect, so as to release the mobile part of the motor from the force of the brake and allow the motor to move the mobile part relative to the fixed part.

12 Claims, 7 Drawing Sheets

SECURE, MOTOR-DRIVEN HINGE TO BE PROVIDED ON A HUMANOID ROBOT

CROSS-REFERENCE TO RELATED APPLICATIONS

This application is a National Stage of International patent application PCT/EP2015/062621, filed on Jun. 5, 2015, which claims priority to foreign French patent application No. FR 1455092, filed on Jun. 5, 2014, the disclosures of which are incorporated by reference in their entirety.

FIELD OF THE INVENTION

The invention relates to a secured motorized articulation intended to be mounted between two limbs of a humanoid-type robot. More specifically, it relates to a motorized articulation secured by means of a brake activated by default by spring effect, an actuator making it possible to deactivate the brake and release the operation of the articulation.

BACKGROUND

The human body comprises a very large number of articulations ensuring the junction between bones or limbs of the body. There are, for example, approximately forty articulations in a lower human limb, from the hip to the ankle. These articulations are mobile by means of muscles, and take various forms to allow varied movements. Numerous attempts have been made in humanoid-type robots to best reproduce the behavior and the movements of a human being. Various types of articulations are known that are capable of moving by means of an electric motor one limb relative to another according to one or more degrees of freedom.

One difficult situation is that of an electrical power outage that can for example occur due to a computer error or a loss of battery charge. With the drive by the electric motor being interrupted, the articulation is free and the robot is liable to fall. This situation is all the more difficult when the robot is large in size and very heavy. With a view to widespread use by any consumer, efforts are made to improve the safety of use of the humanoid robots.

SUMMARY OF THE INVENTION

The invention aims to provide a solution to this particular situation of a power outage, in order to improve the safety of use of the humanoid robots, in particular of the robots of large size, and meet the relative emerging regulatory requirements.

To this end, the subject of the invention is a secured motorized articulation intended to be mounted between a first and a second limbs of a humanoid-type robot, characterized in that it comprises:
  a motor comprising a fixed part intended to be linked to the first limb, and a mobile part that can be moved relative to the fixed part and intended to be linked to the second limb,
  a brake capable of exerting a force on the mobile part of the motor by spring effect, to prevent the movement of the mobile part relative to the fixed part,
  an actuator capable of displacing the brake by opposing the spring effect, so as to release the mobile part of the motor from the force of the brake and allow the motor to move the mobile part relative to the fixed part.

Advantageously, the brake is configured to prevent the movement of the mobile part relative to the fixed part up to a predetermined threshold force, a force greater than said threshold force exerted between the mobile part and the fixed part of the motor generating a movement of the mobile part relative to the fixed part.

Advantageously, the articulation is configured such that:
  the motor is a rotary electric motor, the fixed part comprising a base pad and the mobile part comprising a shaft that can be driven in rotation relative to the base pad and a bell housing secured to the shaft,
  the brake comprises a shoe that can be displaced between a secured position, in which the shoe in contact with the bell housing exerts a force on the bell housing to prevent, by friction, the rotation of the shaft relative to the base pad, and an operational position, in which the shoe is separated from the bell housing, releasing the shaft from the force of the brake.

Advantageously, the articulation is configured such that:
  the bell housing consists of a metal material and is of substantially cylindrical form,
  the shoe consists of an elastomer material and is configured to come into contact with the bell housing along a radial section of the bell housing.

Advantageously, the brake comprises:
  a fixed arm secured to the base pad,
  a mobile arm linked by a first end to the fixed arm by means of a pivot link of axis substantially parallel to the main axis of the shaft, the shoe being fixed to the mobile arm,
  a helical spring wound about the axis of the pivot link and bearing on the one hand on the fixed arm and on the other hand on the mobile arm so as to exert a force tending to separate the mobile arm and the fixed arm.

Advantageously, the brake comprises:
  a fixed arm secured to the base pad,
  a mobile arm linked by a first end to the fixed arm by means of a pivot link of axis substantially parallel to the main axis of the shaft, the shoe being fixed to a pad mounted on a ball joint on the mobile arm,
  a helical spring wound about the axis of the pivot link and bearing on the one hand on the fixed arm and on the other hand on the mobile arm so as to exert a force tending to separate the mobile arm and the fixed arm.

Advantageously, the actuator is a linear actuator comprising a sheath secured to the base pad and a rod, translationally mobile in the sheath, and linked to a second end of the mobile arm, the linear actuator being configured to make it possible to displace the mobile arm in rotation relative to the fixed arm, by opposing the spring effect, by translation of the rod in the sheath.

Advantageously, the articulation is configured such that the mobile arm has a half-moon form between its first and its second ends, forming a half-cover partially covering the bell housing.

Advantageously, the articulation comprises a gear device driven by the mobile part of the motor and intended to be linked to the second limb.

Advantageously, the articulation comprises means for making it possible to displace the brake by a manual intervention.

Advantageously, the articulation comprises measurement means capable of detecting a displacement of the brake.

The invention relates also to a humanoid-type robot comprising a motorized articulation with the features described previously.

Advantageously, the robot comprises a limb like a thigh and a limb like a torso, articulated by an articulation as previously described.

Advantageously, the robot comprises a limb like a leg and a limb like a thigh, articulated by an articulation as previously described.

BRIEF DESCRIPTION OF THE DRAWINGS

The invention will be better understood and other advantages will become apparent on reading the detailed description of an embodiment given by way of example in the following figures.

For clarity, the same elements will bear the same references in the different figures.

DETAILED DESCRIPTION

Figure 1A:
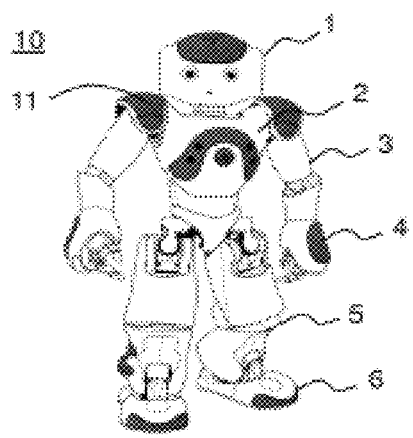
FIGS. 1a and 1b represent two examples of humanoid robots that can be equipped with a secured articulation according to the invention.
Figure 1B:
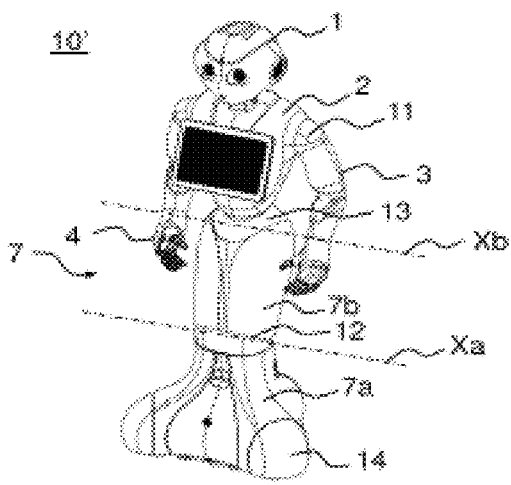

FIGS. 1a and 1b represent two examples of humanoid robots developed by the company ALDEBARAN ROBOTICS™. The humanoid robot 10 represented in FIG. 1a comprises a head 1, a torso 2, two arms 3, two hands 4, two legs 5 and two feet 6. The humanoid robot 10' represented in FIG. 1b comprises a head 1, a torso 2, two arms 3, two hands 4 and a skirt 7. These two robots comprise several articulations allowing the relative movement of the different limbs of the robot in order to reproduce the human morphology and the movements thereof. The robots 10 and 10' comprise, for example, an articulation 11 between the torso 2 and each of the arms 3. The articulation 11 is motorized about two axes of rotation to allow the arm 3 to move relative to the torso 2 in the manner of the possible movements by a shoulder of a human being.

The humanoid robot 10 also comprises several articulations for moving the legs of the robot and reproducing the walking movement, in particular articulations that can be likened to a hip between the torso and the thigh, to a knee between the thigh and the leg and to an ankle between the leg and the foot. Several forms of motorized articulations are implemented, moving one of the limbs about one or more degrees of freedom in rotation.

The humanoid robot 10' has a different architecture. To improve the stability and lower the center of gravity of the robot the robot does not comprise a leg but a skirt 7 comprising, in its base, a tripod 14 capable of moving the robot. The skirt also comprises a first articulation 12 like a knee, between a leg 7a and a thigh 7b. A second articulation 13 like a hip is mounted between the torso 2 and the thigh 7b. These two articulations 12 and 13 are pivot links motorized about an axis of rotation. The axis of rotation Xa of the articulation 12 and the axis of rotation Xb of the articulation 13 are substantially parallel to an axis linking the two shoulders of the robot making it possible to tilt the robot forward or backward.

The humanoid robot 10' in standing position measures approximately 1.1 to 1.2 meters for a total weight of approximately 25 to 30 kg. An assurance that the top part of the robot cannot rotationally drive the articulation under the effect of its own weight is sought. The aim of the secured articulation according to the invention is to prevent the falling of the top part of the robot, for example from the thigh to the head by rotation about the articulation 12, even in the case of an outage of electrical power to the articulation. More specifically, the articulation according to the invention makes it possible to block the rotation of the articulations when the top part of the robot is within a cone of vertical axis and of angle of the order of 10 degrees.

The invention is described hereinbelow for a motorized articulation with one degree of freedom of pivot link type, implemented in a robot of large size similar to the humanoid robot 10', and in particular for an articulation that can be likened to a knee or a hip. Obviously, the invention is not limited to this particular application. More generally, the articulation according to the invention is intended to be mounted between a first and a second limbs of a robot, such a humanoid-type robot, an animal-type robot, or even an industrial robot. The first and the second limbs are, generally, mechanical subassemblies that are required to be displaced relative to one another. A "limb" should be understood hereinbelow to mean a mechanical subassembly of the robot such as a leg, a thigh, a torso, a head, an arm, a hand, or a combination thereof. Note also that while the following figures detail a particular example of an articulation of pivot link type with one degree of freedom, it is understood that the invention applies in principle to any type of articulations, for example an articulation with two degrees of freedom in rotation, or even an articulation with one or more degrees of freedom in translation. Generally, the invention relates to an articulation comprising a motor capable of displacing a second limb relative to a first limb.

Figure 2A:
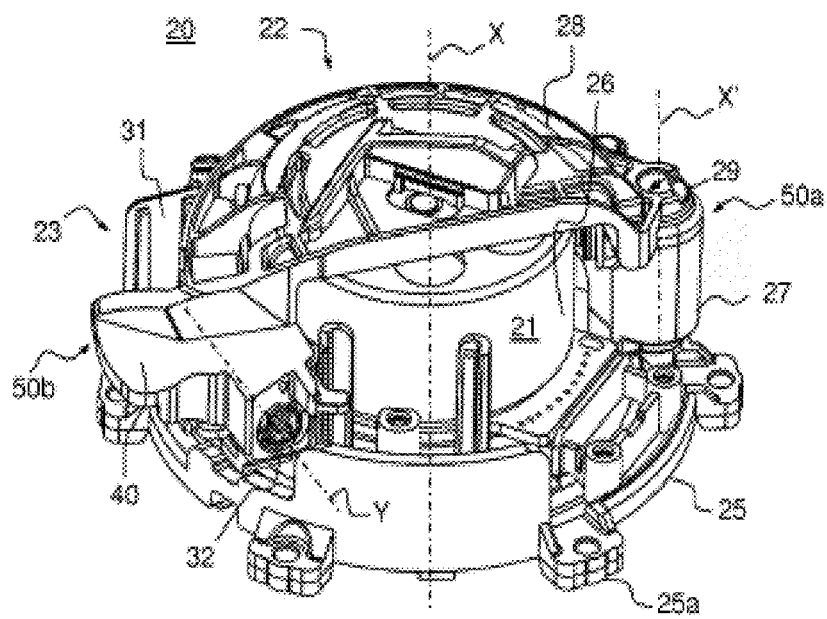
FIGS. 2a and 2b represent, according to a first perspective view a first example of secured articulation, respectively in a secured position and an operational position.
Figure 2B:
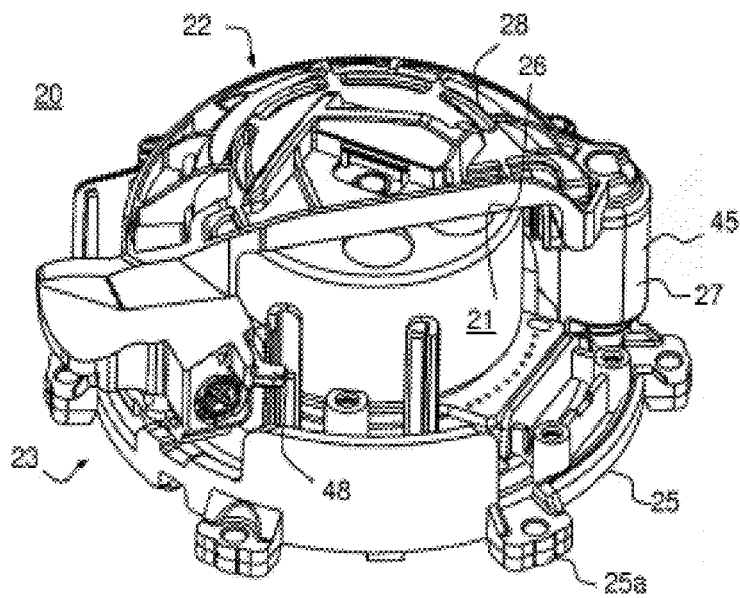

FIGS. 2a and 2b represent, according to a first perspective view, an example of secured articulation, respectively in a secured position and an operational position. The articulation 20 is intended to be mounted between a first and a second limbs not represented in the figures. The articulation 20 comprises:

a motor 21 capable of moving the second limb relative to the first limb, the motor comprising a fixed part intended to be linked to the first limb, and a mobile part that can be moved relative to the fixed part and intended to be linked to the second limb, a brake 22 capable of exerting a force on the mobile part of the motor 21 by spring effect, to prevent the movement of the mobile part relative to the fixed part, an actuator 23 capable of displacing the brake 22 by opposing the spring effect, so as to release the mobile part of the motor 21 from the force of the brake and allow the motor 21 to move the mobile part relative to the fixed part.

The motor 21 is preferentially a rotary electric motor, comprising a motor base pad 25 and a shaft that can be driven in rotation relative to the base pad 25 about an axis X. The motor base pad 25 forms the fixed part of the motor and comprises a base in disk form intended to be fixed to the first limb of the robot by means of six fixing tabs 25a distributed angularly about the base of the base pad. The shaft (not visible in the figures) forms the mobile part of the motor and is secured to a motor bell housing 26 of substantially cylindrical form. The shaft passes through the motor base pad and is intended to be linked to the second limb preferentially via a gear device (not represented). Thus configured, the electric motor 21 makes it possible to drive the shaft in rotation relative to the base pad, driving the second limb in rotation relative to the first limb.

The articulation 20 also comprises the brake 22. In FIG. 2a the articulation is represented in a secured position, in which the brake exerts a force on the mobile part of the motor to prevent the shaft from being driven in rotation. In FIG. 2b the articulation is represented in an operational position, in which the brake is displaced so as to release the motor from the braking force and allow the shaft to be driven in rotation. In the secured position, the brake 22 exerts a force on the motor bell housing 21 preferentially consisting of a metal material, via a shoe preferentially consisting of an elastomer material, coming into contact with the cylindrical bell housing along a radial section thereof. The shoe exerts a force on the motor bell housing so as to prevent, by friction, the rotation of the shaft relative to the base pad.

In the example represented, the brake 22 comprises a fixed arm 27 secured to the motor base pad 25 and a mobile arm 28. The mobile arm 28 has a half-moon form between a first end 50a and a second end 50b, forming a half-cover partially covering the motor bell housing. The mobile arm 28 is linked by the first end 50a to the fixed arm 27 by means of a pivot link 29 of axis X' substantially parallel to the axis X of rotation of the shaft. In this first example of articulation, the shoe is fixed to an internal surface of the mobile arm so as to come into contact with the radial surface of the bell housing 26, upon a rotation of the mobile arm about its axis X'. The shoe is fixed substantially equidistantly from the first and the second ends 50a and 50b of the mobile arm 28. The brake 22 also comprises a spring mechanism, preferentially a helical spring 45 wound about the axis X' and bearing on the fixed arm 27 and on the mobile arm 28 so as to exert a force tending to separate the mobile arm and the fixed arm. The force exerted by the spring between the mobile arm and the fixed arm is transmitted to the shoe in contact with the bell housing, making it possible to block the shaft in rotation. By default, the articulation is blocked in rotation.

The articulation also comprises an actuator 23 capable of displacing the brake by opposing the spring effect, so as to release the motor from the force of the brake and allow the motor to drive the shaft in rotation. In the example represented, a linear actuator (not represented) is mounted between the fixed arm 27 and the second end 50b of the mobile arm 28. The linear actuator comprises a rod that is translationally mobile between two positions along an axis Y inside a sheath. The sheath is fixed to a support 31 secured to the fixed arm 27. The rod has, at its end, a spherical form co-operating with a spherical imprint 32 formed in the mobile arm 28. The travel of the rod between its two positions defines the travel of the mobile arm between the secured position and the operational position. By default, for example when the articulation is not electrically powered, the rod is held by the effect of the spring in its most extended position. Conversely, when the articulation is powered, the actuator can be controlled to retract the rod into the sheath by exerting a force countering the spring effect. Various embodiments of the linear actuator can be envisaged, notably a linear actuator that can be driven by electromagnet.

Figure 4A:
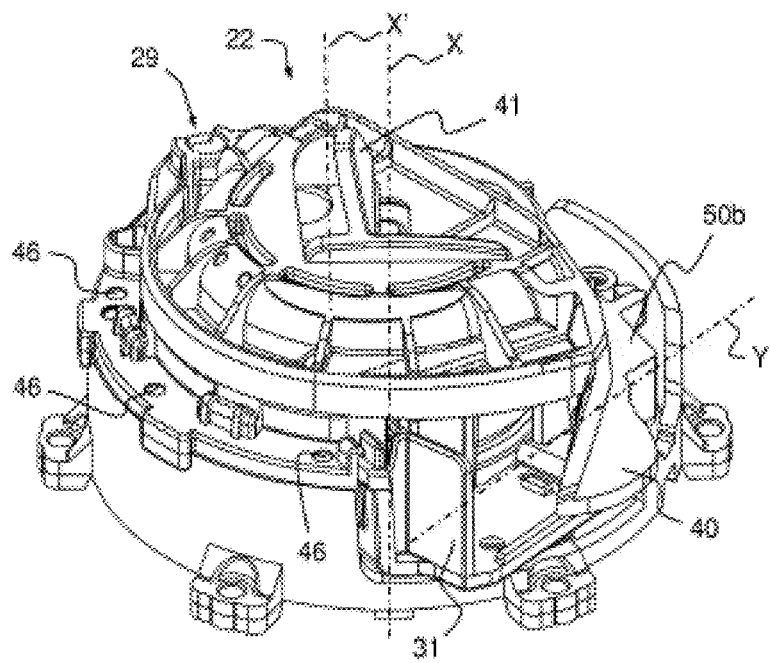
FIGS. 4a and 4b represent, according to a second perspective view, the example of secured articulation, respectively in the operational position and the secured position.
Figure 4B:
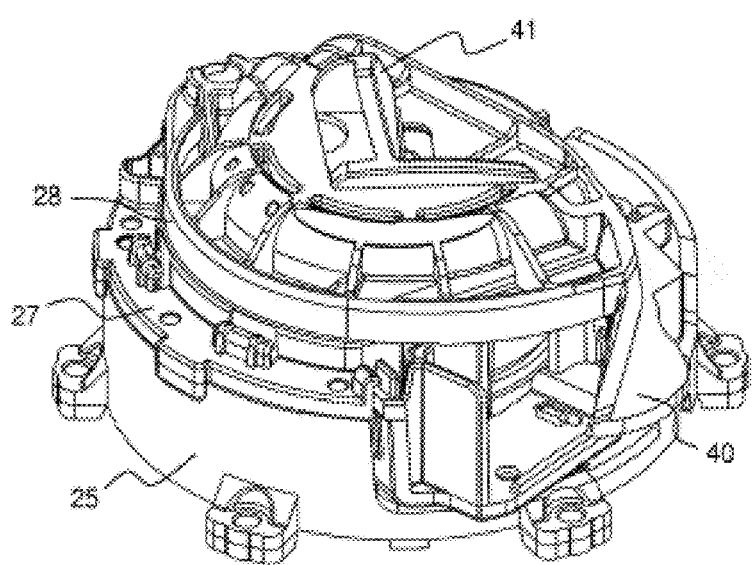

The articulation also comprises means for manually displacing the brake to release the rotational movement of the two limbs. In particular, an inclined plane 40 is formed on the mobile arm, in proximity to its second end, such that a tool displaced parallel to the axis X of rotation of the shaft, and against this inclined plane 40, can displace the mobile arm from the secured position to the operational position, by countering the spring effect. A second inclined plane 41, visible in FIGS. 4a and 4b, is also formed in proximity to the center the half-moon form of the mobile arm. In practice, the motorized articulation represented in the figures is incorporated in the robot inside an outer jacket represented in FIGS. 1a and 1b giving the outer aesthetic appearance of the robot. Advantageously, the outer jacket comprises an orifice formed facing the inclined plane of the articulation, making it possible to insert a suitable key to release the brake and make it possible to manually fold or unfold the articulated limbs.

According to one aspect of the invention, the securing of the articulation therefore consists in providing the driving motor with a brake mechanism activated by default by means of a spring mechanism, and means for deactivating the brake mechanism by countering the spring mechanism. Thus, the articulation is blocked in the case of a power outage to the articulation linked to a loss of battery charge, a computer crash or a deliberate emergency stop. The means for deactivating the brake mechanism comprise means that can be driven electronically, such is the role of the actuator, and manual means, such is the role of the inclined planes.

Figure 3A:
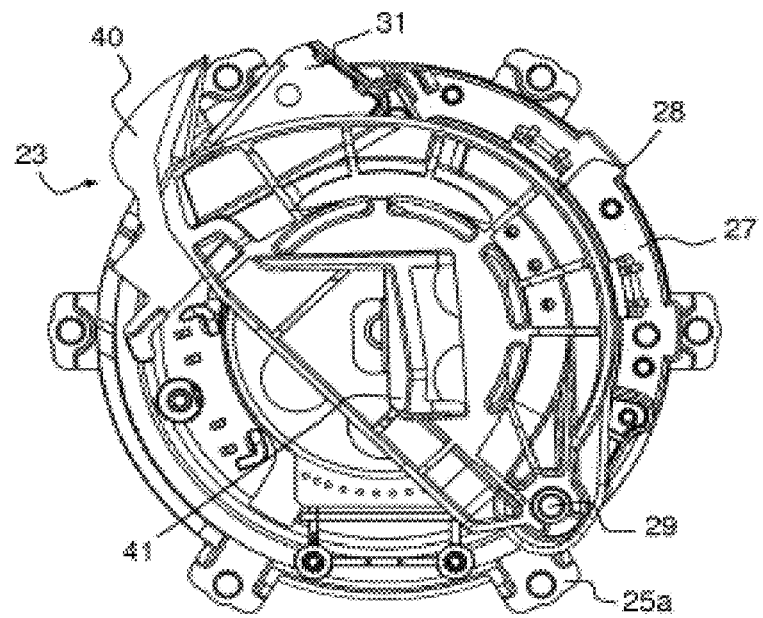
FIGS. 3a, 3b and 3c represent, in plan view, the example of secured articulation, respectively in the secured position, the operational position, and in the two positions superimposed.
Figure 3B:
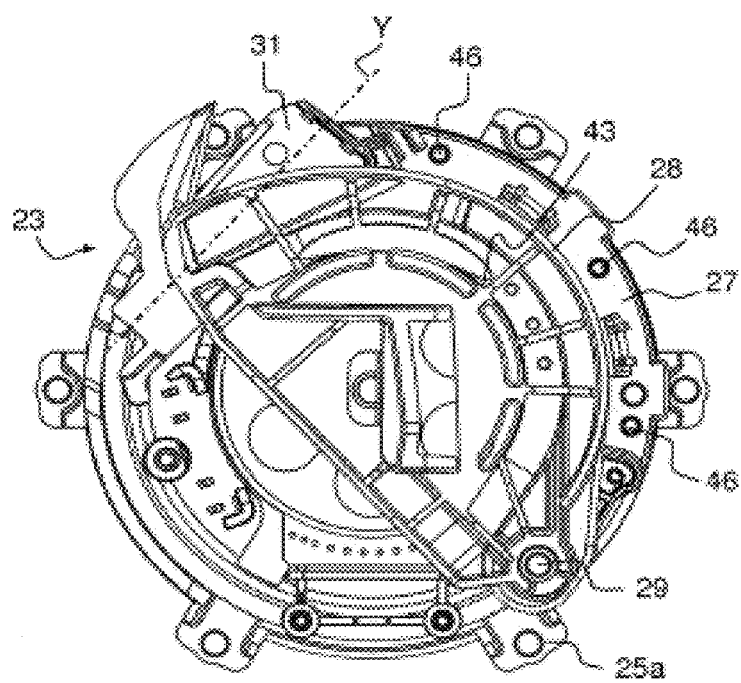
Figure 3C:
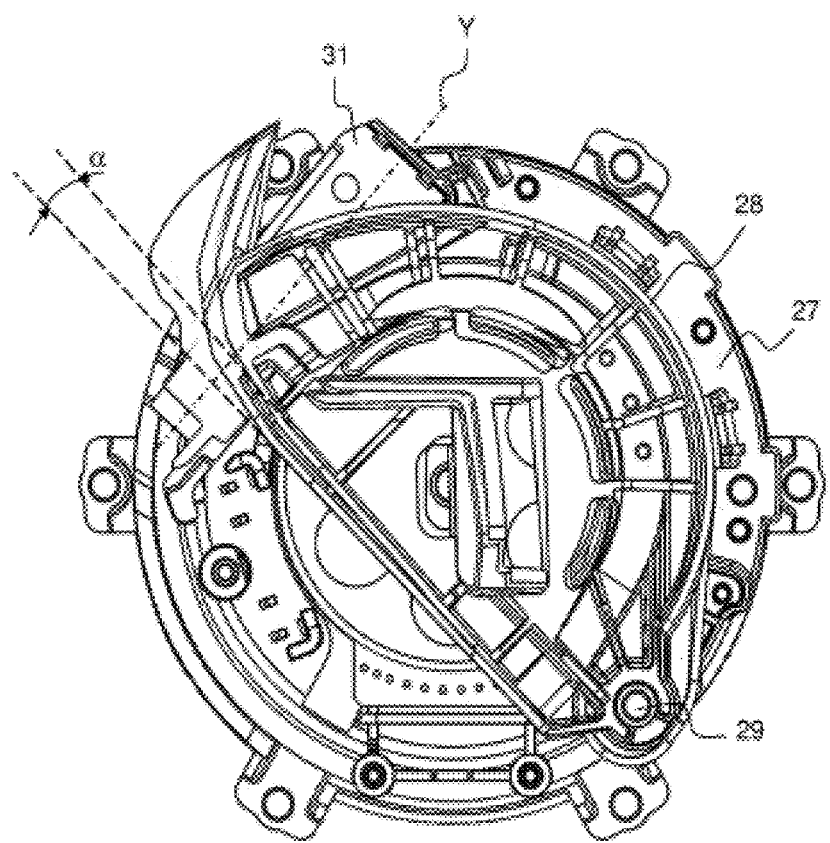

FIGS. 3a, 3b and 3c represent, in plan view, the example of secured articulation, respectively in the secured position, the operational position and in the two positions superimposed. In the example represented, the diameter of the motor base pad is approximately 90 mm, the height of the articulation is approximately 40 mm. In the secured position, the mobile arm 28 presses the elastomer shoe against the motor bell housing 26. The half-moon form of the mobile arm is advantageous. It makes it possible to closely follow the form of the mobile bell housing such that the elastomer shoe can be placed in contact with the bell housing along a radial section of the shaft. The shoe is not visible in the figures, its position is represented by means of the reference 43. Typically, a substantially rectangular shoe of approximately 15 mm in height and width is retained. The half-moon form also makes it possible to secure the articulation within a reduced bulk. Typically, a travel of 2.5 mm of the linear actuator corresponding to an angle $\alpha$ of approximately 4 degrees separates the secured position from the operational position. Note too that the articulation is advantageously intended to be linked to the two limbs of the robot so that the mobile arm in half-moon form is positioned in the upper part of the motor bell housing. Thus configured, the mobile part of the brake presses the shoe, not only by spring effect but also naturally by the effect of gravity. In the absence of power supply and in the case of a weakening of the power of the return springs, the articulation naturally remains braked by the shoe.

The articulation remains blocked as long as an outside force exerted between the mobile part and the fixed part of the motor remains less than the force exerted on the motor by the brake. When the force applied between the mobile part and the fixed part of the motor is greater than the force exerted by the brake, the mobile part is driven in movement. Since the friction force is insufficient to immobilize the bell housing against the shoe, the shaft slips in rotation despite the braking exerted by the shoe. The mobile part is braked but not immobilized. In other words, the friction contact between the shoe 43 and the bell housing 26 makes it possible to brake without necessarily stopping the rotation of the bell housing 26. This feature makes it possible, by choice, to slow down or stop the bell housing 26. Moreover, the contact is made by the half-moon form mobile arm 28, which has the technical effect of closely following the form of the bell housing with a better contact and of securing the articulation within a reduced bulk.

By a suitable dimensioning of the spring and of the shoe, it is possible to define the force exerted on the motor by spring effect. In other words, the brake can be configured to prevent movement of the mobile part relative to the fixed part up to a predetermined threshold force, a force greater than this threshold force, exerted between the mobile part and the fixed part generating a movement of the mobile part relative to the fixed part.

The capacity to adjust the value of this threshold force is a particularly advantageous feature of the invention. It becomes possible to adapt the behavior of the articulation according to the situations encountered. In the case of the humanoid robot 10' the threshold force is determined in such a way that the articulation remains blocked in rotation as long as the top part of the robot (here including the thigh 7b, the torso 2, the arms 3 and the head 1) is within a cone of vertical axis and of angle of the order of 10 degrees. Outside of this cone, the force exerted on the articulation by the effect of gravity from the upper part of the robot is greater than the threshold force and the limbs are driven in rotation, the articulation being simply braked. The speed of the braked rotation can advantageously be configured by the dimensioning of the shoe and of the spring. The braked rotational movement is also advantageous for securing the articulation, by avoiding the breaking of components exposed to a significant force. In other words, that makes it possible to preserve the mobility of the parts involved in the gear chain following the motor. This mobility makes it possible for example to withstand a violent impact on an articulation implementing the braking system in its rubbing position, since the gears will be able to rotate, even slowly, in order to dissipate the energy of the impact. In the opposite hypothesis of a blocking of the articulation by mechanical means independent of the force exerted the impact force in the case of a fall or of violent impact would be reflected throughout the drive chain of the articulation, ultimately resulting in the breaking of the most fragile components, for example of the motor or of the gear device.

This implementation of a brake acting by friction is advantageous because it defines two ranges of use, a first range in which the articulation is blocked, any force exerted between the limbs not resulting in movement of the articulation, and a second range in which a force exerted between the limbs drives the movement of the limbs, the articulation being braked.

FIGS. 4a and 4b represent, according to a second perspective view, the example of secured articulation, respectively in the secured position and in the operational position. This second view illustrates the location of the linear actuator on the motor base pad 25, in proximity to the second end 50b of the mobile arm 28. The linear actuator comprises a sheath, fixed to the support 31 formed in the fixed arm 27, and a rod of which a spherical end co-operates with the spherical imprint 32 formed in the mobile arm to form a ball joint link. In the absence of electrical power supply or of control of the actuator, the rod is held in the retracted position by the effect of the spring. The displacement of the rod in translation along the axis Y, controlled by the linear actuator, makes it possible to counter the spring effect and release the shaft from the grip of the brake.

Advantageously, the fixed arm 27 and the mobile arm 28 consist of a glass fiber-filled thermoplastic material, preferentially of PA66-GF35 type. Various components, such as the support 31 for example, can be added to the mobile arm by an overmolding type method. The shoe can consist of a polyurethane-based elastomer material. The shoe is preferentially fixed to the mobile arm by a method of bi-injection type, allowing for a molecular cohesion suited to the forces that can be exerted on the shoe.

Advantageously, the assembly comprising the fixed arm, the mobile arm, the shoe, the helical spring and the actuator is assembled in a first step. The pre-assembled assembly is then mounted on the motor base pad 25. To this end, the motor base pad and the fixed arm comprise means making it possible to preposition the assembly relative to the motor, before fixing by means of three fixing imprints 46 formed in the fixed arm and the motor base pad.

Figure 5A:
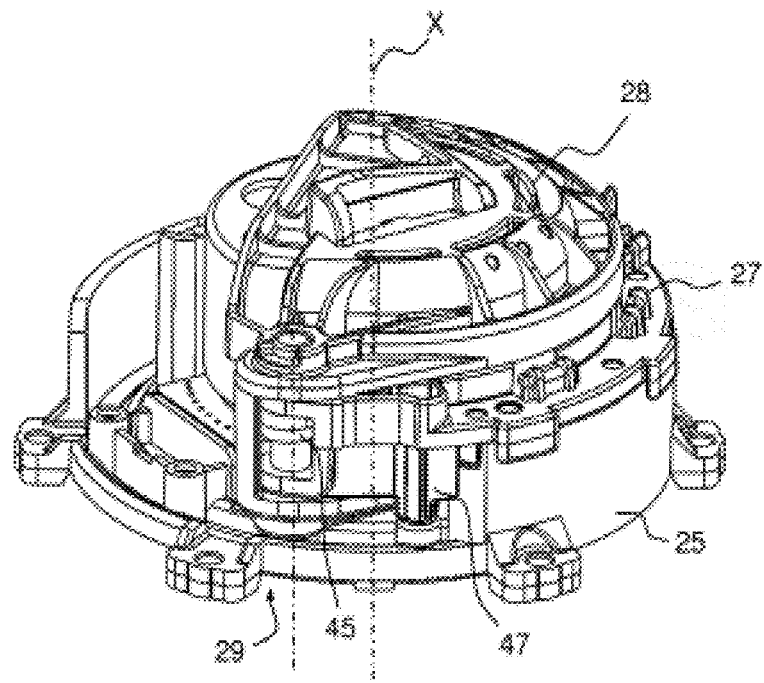
FIGS. 5a and 5b represent, according to a third perspective view, the example of secured articulation, respectively in the operational position and the secured position.
Figure 5B:
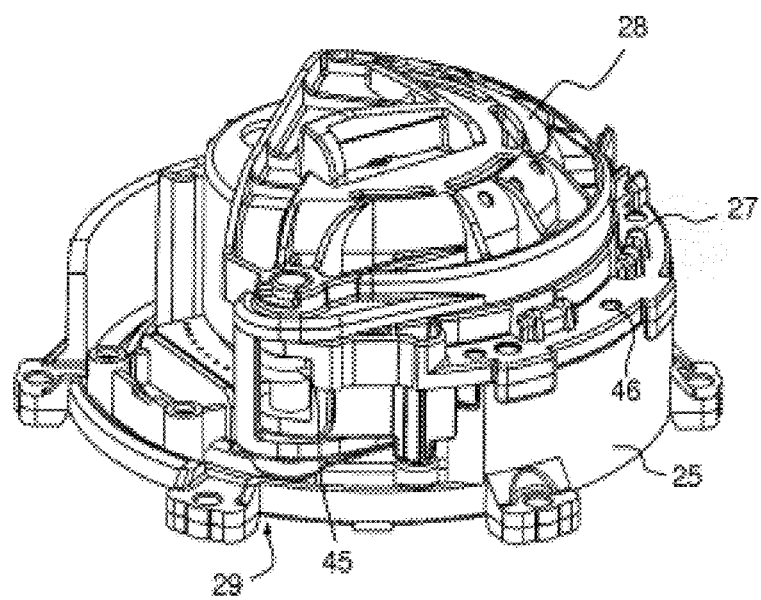

FIGS. 5a and 5b represent, according to a third perspective view, the example of secured articulation, respectively in the secured position and in the operational position. This last perspective view shows the detail of the pivot link 29 between the fixed arm 27 and the mobile arm 28. The spring 45 is wound about the axis X' and bears against a surface of the mobile arm and a surface of the fixed arm so as to exert a force tending to separate the fixed arm and the mobile arm.

Advantageously, the fixed arm also comprises force take-up means 47, between the motor base pad and the fixed arm, making it possible to pass on the force exerted by the spring on the fixed arm to the motor base pad.

Fixing mobile arm position measurement means is also envisaged, the measured position information being transmitted to an electronic control unit for the driving of the motorized articulation. Optical measurement means are in particular envisaged. For that, the mobile arm comprises an end 48, visible in FIG. 2b, configured to intercept—in the secured position only—an optical beam of axis parallel to the axis X.

Figure 6:
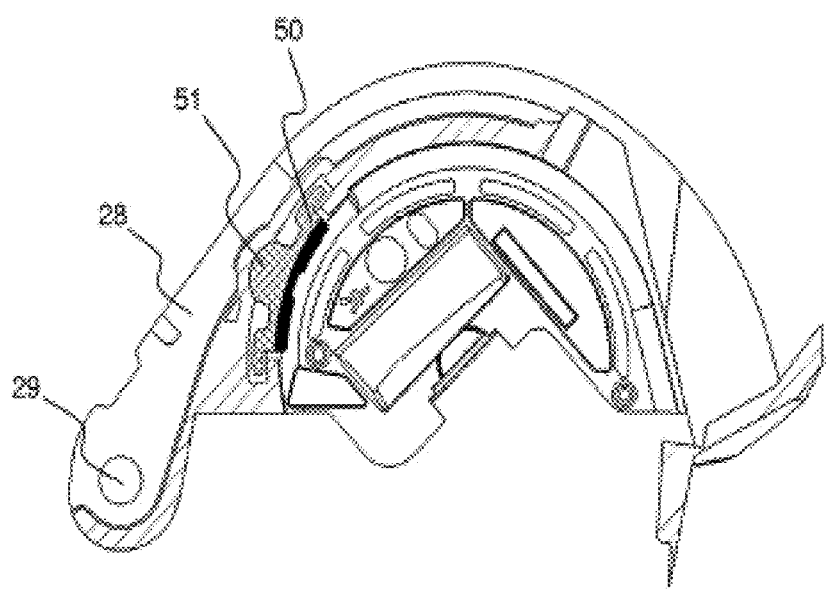
FIG. 6 represents, in a view from below, a second example of secured articulation.

FIG. 6 represents, in a view from below, a second example of secured articulation. This second example of articulation has numerous similarities with the first example already described. As previously, the brake comprises a fixed arm secured to the base pad and a mobile arm 28 linked to the fixed arm by a pivot link 29. In FIG. 6 only the mobile arm 28 of the brake is represented. The definition and the principle of operation of the other components, like the motor, the actuator or the fixed arm of the brake are not repeated in detail systematically.

This second example of articulation is distinguished from the first example by the definition of the shoe coming into contact with the motor bell housing. In this second example a shoe 50 intended to come into contact with the motor bell housing to brake the latter is mounted on a pad 51 mounted on a ball joint on the mobile arm 28. The pad 51 has a specific form configured to creep under the combined action of the static and dynamic tangential friction forces and of the pressure. This deformation being possible symmetrically regardless of the direction of rotation of the motor bell housing.

The invention claimed is:

1. A secured motorized articulation intended to be mounted between a first and a second limbs of a humanoid-type robot, comprising:
    a motor comprising a fixed part intended to be linked to the first limb, and a mobile part that can be moved relative to the fixed part and intended to be linked to the second limb,
    a brake capable of exerting a force on the mobile part of the motor by spring effect, to prevent the movement of the mobile part relative to the fixed part, an actuator capable of displacing the brake by opposing the spring effect, so as to release the mobile part of the motor from the force of the brake and allow the motor to move the mobile part relative to the fixed part, wherein the motor is a rotary electric motor, the fixed part comprising a base pad and the mobile part comprising a shaft that can be driven in rotation relative to the base pad and a bell housing secured to the shaft, and the brake comprises a shoe that can be displaced between a secured position, in which the shoe in contact with the bell housing exerts a force on the bell housing to prevent, by friction, the rotation of the shaft relative to the base pad, and an operational position, in which the shoe is separated from the bell housing, releasing the shaft from the force of the brake, and wherein the bell housing consists of a metal material and is of substantially cylindrical form, and the shoe consists of an elastomer material and is configured to come into contact with the bell housing along a radial section of the bell housing.

2. The articulation as claimed in claim 1, wherein the brake is configured to prevent the movement of the mobile part relative to the fixed part up to a predetermined threshold force, a force greater than said threshold force exerted between the mobile part and the fixed part of the motor generating a movement of the mobile part relative to the fixed part.

3. The articulation as claimed in claim 1, wherein the brake comprises:
   a fixed arm secured to the base pad,
   a mobile arm linked by a first end to the fixed arm by means of a pivot link of axis substantially parallel to the main axis of the shaft, the shoe being fixed to the mobile arm,
   a helical spring 454 wound about the axis of the pivot link and bearing on the one hand on the fixed arm and on the other hand on the mobile arm so as to exert a force tending to separate the mobile arm and the fixed arm.

4. The articulation as claimed in claim 3, wherein the actuator is a linear actuator comprising a sheath secured to the base pad and a rod, translationally mobile in the sheath, and linked to a second end of the mobile arm, the linear actuator being configured to make it possible to displace the mobile arm in rotation relative to the fixed arm, by opposing the spring effect, by translation of the rod in the sheath.

5. The articulation as claimed in claim 4, wherein the mobile arm has a half-moon form between its first and its second ends, forming a half-cover partially covering the bell housing.

6. The articulation as claimed in claim 1, wherein the brake comprises:
   a fixed arm secured to the base pad,
   a mobile arm linked by a first end to the fixed arm by means of a pivot link of axis substantially parallel to the main axis of the shaft, the shoe being fixed to a pad mounted on a ball joint on the mobile arm,
   a helical spring wound about the axis of the pivot link and bearing on the one hand on the fixed arm and on the other hand on the mobile arm so as to exert a force tending to separate the mobile arm and the fixed arm.

7. The articulation as claimed in claim 1, comprising a gear device driven by the mobile part of the motor and intended to be linked to the second limb.

8. The articulation as claimed in claim 1, comprising means for making it possible to displace the brake by a manual intervention.

9. The articulation as claimed in claim 1, comprising measurement means capable of detecting a displacement of the brake.

10. A humanoid-type robot comprising a motorized articulation as claimed in claim 1.

11. The robot as claimed in claim 10, comprising a limb like a thigh and a limb like a torso.

12. The robot as claimed in claim 10, comprising a limb like a leg and a limb like a thigh.

* * * * *

UNITED STATES PATENT AND TRADEMARK OFFICE
CERTIFICATE OF CORRECTION

PATENT NO.         : 10,406,699 B2
APPLICATION NO.    : 15/311113
DATED              : September 10, 2019
INVENTOR(S)        : Vincent Clerc et al.

Page 1 of 1

It is certified that error appears in the above-identified patent and that said Letters Patent is hereby corrected as shown below:

In the Claims

Claim 3, Column 9, Line 35, "spring 454 wound" should read -- spring wound --.

Signed and Sealed this
Seventeenth Day of December, 2019

Andrei Iancu
*Director of the United States Patent and Trademark Office*